US012172907B2

(12) United States Patent
Del Picolo et al.

(10) Patent No.: US 12,172,907 B2
(45) Date of Patent: Dec. 24, 2024

(54) MODULAR INSTALLATION FOR TREATING WATER BY FLOTATION

(71) Applicant: Veolia Water Solutions & Technologies Support, Saint-Maurice (FR)

(72) Inventors: Cristina Del Picolo, Roveredo in Piano (IT); Giuseppe Girolami, Treviso (IT); Romain Verchere, Paris (FR); Nathalie Vigneron-Larosa, Montreuil (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 534 days.

(21) Appl. No.: 17/432,977

(22) PCT Filed: Feb. 13, 2020

(86) PCT No.: PCT/EP2020/053797
§ 371 (c)(1),
(2) Date: Aug. 23, 2021

(87) PCT Pub. No.: WO2020/173716
PCT Pub. Date: Sep. 3, 2020

(65) Prior Publication Data
US 2022/0234913 A1   Jul. 28, 2022

(30) Foreign Application Priority Data
Feb. 25, 2019   (FR) .................................... 1901906

(51) Int. Cl.
*C02F 1/24*   (2023.01)
*B01D 21/00*  (2006.01)
*B01D 21/24*  (2006.01)

(52) U.S. Cl.
CPC ............ *C02F 1/24* (2013.01); *B01D 21/0027* (2013.01); *B01D 21/2438* (2013.01); *C02F 2201/007* (2013.01)

(58) Field of Classification Search
CPC ............ B01D 21/0027; B01D 21/2438; B03D 1/1412; B03D 1/1431; B03D 1/1462;
(Continued)

(56) References Cited

U.S. PATENT DOCUMENTS

| 6,921,478 B2 | 7/2005 | Lambert et al. |
| 7,651,620 B2 | 1/2010 | Vion |

(Continued)

FOREIGN PATENT DOCUMENTS

| CN | 101711178 A | 5/2010 |
| CN | 202208653 U | 5/2012 |

(Continued)

*Primary Examiner* — Dirk R Bass
(74) *Attorney, Agent, or Firm* — COATS & BENNETT, PLLC

(57) ABSTRACT

Installation for treating water by flotation, comprising a substantially parallelepipedal assembly (1) produced by connecting modules (2, 2a), said assembly comprising a contact tank (3) which is provided with supply means for water to be treated (4) and supply means for white water (5), a flotation tank (6) which is provided with means for discharging treated water (7, 7a) and which is separated from said contact tank by a vertical wall (8), and means for discharging floated sludge, characterised in that said contact tank (3) is provided along said flotation tank (6) and delimits a single contact zone for said water to be treated with said white water, and in that said supply means for water to be treated (4) are configured to distribute the water to be treated in said contact tank according to a longitudinal water supply flow, the water distribution flow in the flotation tank being perpendicular to said water supply flow in said contact tank.

11 Claims, 6 Drawing Sheets

(58) Field of Classification Search
CPC .............. B03D 1/1493; B03D 1/242; B03D 2203/008; C02F 1/24; C02F 2201/007; C02F 2201/008

See application file for complete search history.

(56) References Cited

U.S. PATENT DOCUMENTS

| | | |
|---|---|---|
| 8,753,508 B2 | 6/2014 | Domoulin et al. |
| 9,376,331 B2 | 6/2016 | Dumoulin et al. |
| 10,626,024 B2 | 4/2020 | Thouvenot et al. |
| 10,752,520 B2 | 8/2020 | Gaid et al. |
| 2004/0168964 A1 | 9/2004 | Lambert et al. |
| 2005/0115881 A1 | 6/2005 | Vion |
| 2007/0119987 A1 | 5/2007 | Vion |
| 2008/0277329 A1 | 11/2008 | Zhang et al. |
| 2009/0218293 A1 | 9/2009 | Vion |
| 2011/0198295 A1 | 8/2011 | Dumoulin et al. |
| 2014/0326676 A1 | 11/2014 | Dumoulin et al. |
| 2015/0218012 A1 | 8/2015 | Gaid et al. |
| 2017/0297924 A1 | 10/2017 | Gaid et al. |
| 2017/0349453 A1 | 12/2017 | Thouvenot et al. |

FOREIGN PATENT DOCUMENTS

| | | |
|---|---|---|
| DE | 9300384 | 3/1993 |
| FR | 2860735 | 10/2010 |
| FR | 2916196 | 5/2018 |
| FR | 2995603 | 9/2019 |
| IT | TO20080399 A1 | 11/2009 |
| IT | TO20080401 A1 | 11/2009 |
| IT | TO20080402 A1 | 11/2009 |
| KR | 20150062406 | 6/2015 |
| RU | 34162 U1 | 11/2003 |
| RU | 2303000 C2 | 7/2007 |
| SU | 737360 A1 | 5/1980 |
| SU | 1291547 A1 | 2/1987 |
| WO | 2006092592 A1 | 9/2006 |
| WO | 2008142026 A1 | 11/2008 |
| WO | 2016102701 A1 | 6/2016 |

MODULAR INSTALLATION FOR TREATING WATER BY FLOTATION

FIELD OF THE INVENTION

The field of the invention is that of water treatment for purification or potabilisation.

More particularly, the invention relates to an installation for treating water by flotation.

PRIOR ART

Contaminated liquids or waters can contain suspended matter (particles, algae, bacteria, etc.) and dissolved matter (organic matter, micro-pollutants, etc.). There are several techniques in the prior art for treating suspended matter in order to reduce their content.

These techniques include settling and flotation.

The treatment of water by flotation has many advantages over the treatment by settling.

A first advantage is that the treatment of water by flotation is faster than the conventional treatment by settling.

Another advantage is that the treatment by flotation achieves a better removal of algae, oil and grease than the treatment by settling for a higher flow of water to be treated.

Furthermore, another advantage of the treatment by flotation is that it reduces the volume of sludge produced.

The flotation processes include:
natural flotation, where the difference in density between the suspended matter and the water containing it is naturally sufficient for their separation (the matter floats on the surface of the water);
aided flotation, that consists in blowing air bubbles into the liquid mass to improve the separation of the particles and thus make them floatable;
induced flotation, where the density of the suspended matter is initially higher than the one of the water containing it and is artificially reduced with gas bubbles. Indeed, some solid or liquid particles can link up with gas bubbles to form "particle-bubble" couplings having a lower density than the water containing them.

Dissolved air flotation (DAF) is an induced flotation process that uses bubbles with a very small diameter, in practice 40 to 70 micrometres in diameter. It generally involves a combination of different steps: coagulation to neutralise the surface charges of the colloids, and adsorption of dissolved matter; flocculation, using a flocculating polymer material to agglomerate the particles; injection of pressurised water to bring the microbubbles into contact with the flocculated water; separation to separate the floc from the clarified liquid; collection of the clarified liquid; and collection of the floated "sludge".

The DAF technique is traditionally applied in the context of water potabilisation, to good quality water, to cold water that is low in suspended matter, and especially to reservoir water that is rich in algae. The DAF is also used in the treatment of municipal or industrial wastewater for purification.

Thus, a flotation installation comprising a tank for the contact of the water to be treated with air microbubbles, a zone provided under this tank and separated from it by a perforated floor accommodating nozzles for injecting air microbubbles, and a flotation tank separated from the contact tank by a wall crossed in its upper part by the mixture of water and air microbubbles, is known from WO2008142026.

According to this installation, the contact tank is provided at one end of the flotation tank, which has the disadvantage that the distribution of the air microbubbles within the contact tank is not uniform but rather has a gradient. In practice, there are more air bubbles in the zone of the flotation tank that is close to the contact tank than in the zone of the flotation tank that is far from it. This gradient leads to a non-homogeneous treatment of the water entering the installation. A portion of this water receives more air bubbles than the rest and is therefore better treated.

Another disadvantage is that the design and dimensions of this installation make it difficult to transport, especially in containers. However, there is a growing market need for water treatment installations, including flotation devices, that can be easily transported, especially in containers that can be loaded onto container ships, so that they can be brought to sites that are far from their manufacturing site. This occurs, for example, when these installations are to be used at natural disaster sites where water treatment facilities have been damaged or destroyed, or to be rented for one-off needs.

Another disadvantage is that such installations are not modular. However, there is a growing need in the market for water treatment installations, especially flotation devices, with a modular design that can offer different treatment capacities and avoid the use of oversized installations involving increased treatment costs.

In this respect, it should be noted that the Applicant has already proposed modular flotation installations, described in the Italian patent applications ITTO20080399A1 ITTO20080401A1 and ITTO20080402A1. Such installations are built by connecting modules each having a U-shaped cross-section with a side wall provided with a recess delimiting a contact zone with the water to be treated, a flocculant and white water. Thus, each module has a recess on one of its walls, in which the water to be treated and the white water come into contact. These installations are modular and can have a higher or lower capacity depending on the number of modules used to build it.

However, due to their dimensions (size), these installations also cannot be transported in standard containers for maritime transport.

Moreover, the fact that each module has its own dedicated contact zone, in practice a recess, makes the manufacture of the modules more complex and affects the overall cost of such flotation devices.

Finally, this type of installation requires the production of white water to be regulated before start-up, which in practice leads to limiting the speed at which the water to be treated passes through it and limits its capacity.

PURPOSES OF THE INVENTION

The purpose of the present invention is to propose a modular flotation installation that is easy to implement.

Another purpose of the invention is to describe such an installation that is compact and can be transported in a standard container for maritime transport.

SUMMARY OF THE INVENTION

All or part of these purposes are achieved by means of an installation that relates to an installation for treating water by flotation comprising a substantially parallelepipedal assembly produced by connecting modules, said assembly comprising a contact tank which is provided with supply means for water to be treated and supply means for white water, a flotation tank which is provided with means for discharging treated water, said flotation tank being separated from said contact tank by a vertical wall, and means for discharging floated sludge, characterised in that said contact tank is provided along said flotation tank and delimits a single contact zone for said water to be treated with said white water, and in that said supply means for water to be treated are configured to distribute the water to be treated in said contact tank according to a longitudinal water supply flow, the water distribution flow in the flotation tank being perpendicular to said water supply flow in said contact tank.

The invention therefore proposes to arrange the contact tank not at the end of the flotation tank, as for example in the prior art according to WO2008056057, but along it. Concomitantly, the invention also provides for the contact tank to delimit a contact zone that is common to all modules, thus solving the building complexity issue associated with the technique according to ITTO20080399A1, ITTO20080401A1 and ITTO20080402A1.

Thanks to its modularity, the installation has a higher or lower capacity depending on the number of modules used to build it.

According to the invention, the flow of water to be treated supplied to the contact tank is perpendicular to the flow of water in the flotation tank. This goes against the practices of those skilled in the art, who typically, for a better distribution of the mass and hydraulic flows within a flotation device, plan the injection of the water to be treated parallel to the distribution of the water in the flotation tank.

The dimensions of the modules will be chosen so as to allow the creation of installations according to the invention, whose size will allow them to be transported in standard containers for maritime transport.

Preferably, these modules will be designed in such a way that the installation obtained by connecting them has a flotation tank whose height (H) is comprised between 1 and 4 m, preferably between 1 and 2.5 m, and whose width (L) is comprised between 0.5 and 4 m. It will be noted that the height (H) is the distance between the water collection point at the bottom of the flotation tank and the level at which the floated water is collected. Furthermore, the width (L) of the flotation tank is the distance between the vertical wall separating the contact tank and the flotation tank and the opposite wall.

Advantageously, said means for supplying white water to the contact tank include a multiphase pump associated with nozzles capable of producing bubbles with a very small diameter, in practice from 40 to 70 micrometres in diameter.

The use of such nozzles allows the installation according to the present invention to be implemented at higher mirror velocities of the water in the flotation device, in practice in the order of 20 to 25 m/h, than those that can be implemented with the flotation devices of the prior art, which are generally limited to 10 m/h for similar water qualities.

Also advantageously, said means for supplying white water to the contact tank include a multiphase pump and a static rrsixer associated with nozzles capable of producing bubbles with a very small diameter.

According to a preferential variant, said nozzles are provided at a height (h) from the bottom of said contact tank comprised between 0.2 and 2 metres.

These nozzles are preferably provided with a nozzle density comprised between 3 and 30 nozzles, preferably between 5 and 12 nozzles, per square metre of contact tank bottom.

Also according to a variant, said assembly is produced by connecting 2 to 24, preferably 2 to 12, modules.

As already mentioned above, the installations according to the invention have a size that allows them to be transported in standard containers for maritime transport.

Thus, preferably, the total length (LT) of the installation according to the invention is comprised between 0.5 and 20 m, preferably between 1 and 12 m.

Preferably, said means for supplying water to be treated to said contact tank comprise a perforated pipe provided longitudinally in the lower part of said contact tank.

Advantageously, said means for discharging treated water comprise at least one perforated pipe provided longitudinally in the lower part of said flotation tank.

Preferably, said means for discharging floating sludge comprise a scraper provided with means for moving along a longitudinal axis, transverse to the water distribution flow in the flotation tank.

Also preferably, the ratio between the height (H) and the width (L) of the flotation tank is greater than 1.1.

LIST OF FIGURES

An embodiment, given merely as an example, of the flotation installation according to the present invention will now be described in detail, with reference to the drawings, wherein.

EMBODIMENT OF AN INSTALLATION ACCORDING TO THE INVENTION

With reference to FIGS. 1 to 6, the installation shown comprises an assembly 1 of tanks having a parallelepipedal shape arranged on a frame 1a. In addition to this assembly 1, this frame 1a accommodates means for producing white water 10.

Figure 4:
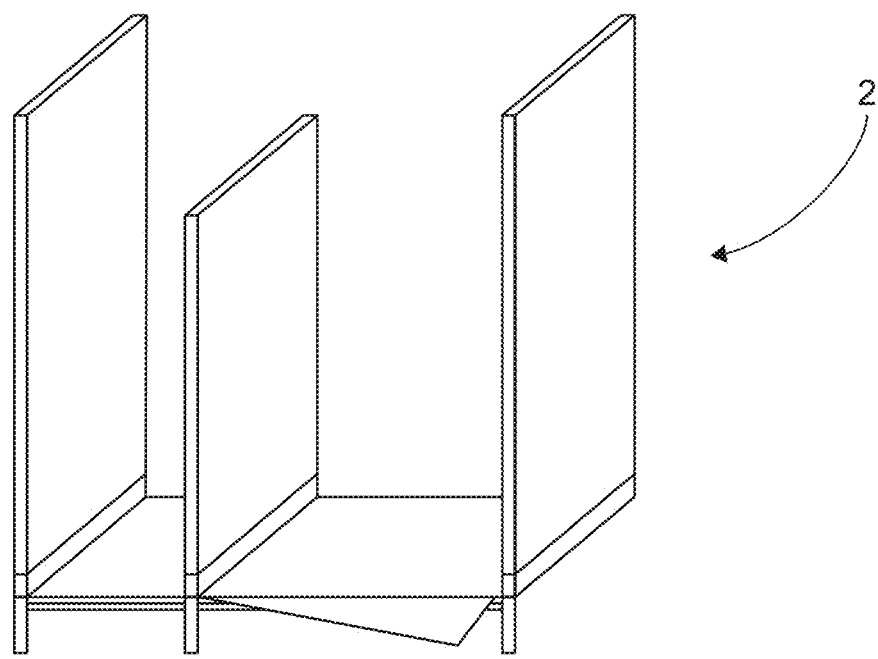
FIG. 4 is a perspective view of one of the modules making up the assembly of contact and flotation tanks of this installation.

This assembly of tanks is produced by connecting two modules 2 as shown in FIG. 4. It will be noted that in other embodiments, more than two modules may of course be used to produce said assembly.

These modules 2 are connected to each other and associated with end walls 2a and 2b to form the assembly 1 according to techniques known to those skilled in the art and thus produce a contact tank 3 and a flotation tank 6.

The contact tank 3 is provided with supply means for water to be treated 4 and supply means for white water 5.

The supply means for water to be treated 4 include a perforated pipe provided in the lower part of the contact tank 3, longitudinally to it.

The supply means for white water 5 include a supply pipe provided with nozzles 5a (see FIG. 6) allowing the generation of air bubbles with a very small diameter and connected to a multiphase pump (not shown).

Figure 6:
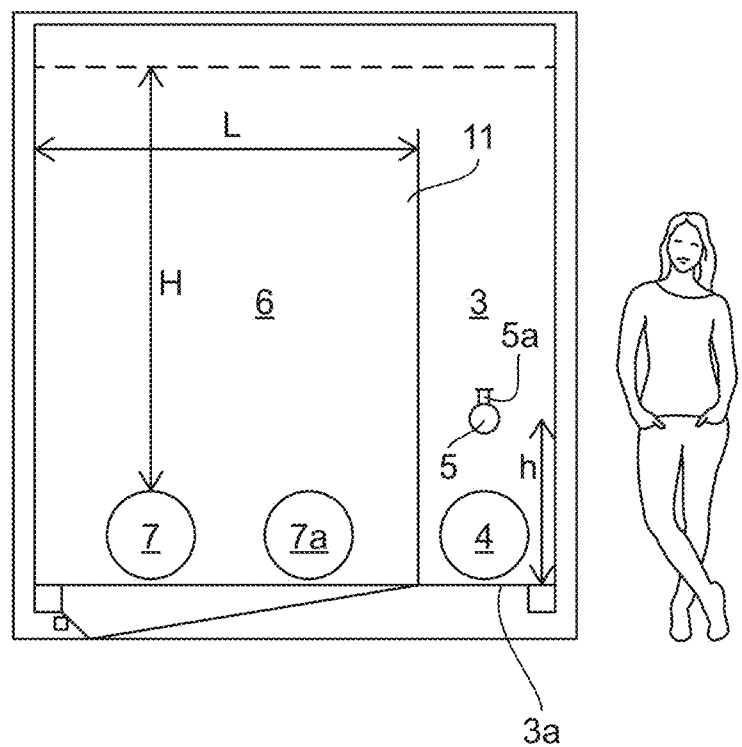
FIG. 6 is a side cross-section view of the assembly of contact and flotation tanks of this installation.

This pipe is provided parallel to the pipe of the supply means for water to be treated 4, and above it. As can be seen in FIG. 6, these nozzles are thus provided in the contact tank at a height (h) from the bottom 3a of the latter, comprised between 0.2 and 2 metres. The nozzle density on the pipe is designed to optimise the flotation process in the flotation tank and is, in practice, advantageously comprised between 3 and 30 nozzles per square metre of contact tank bottom.

The flotation tank 6 is also provided with means for discharging treated water comprising two pipes 7, 7a provided in its lower part. The flotation tank 6 is separated from said contact tank by a vertical wall 8.

Figure 5:
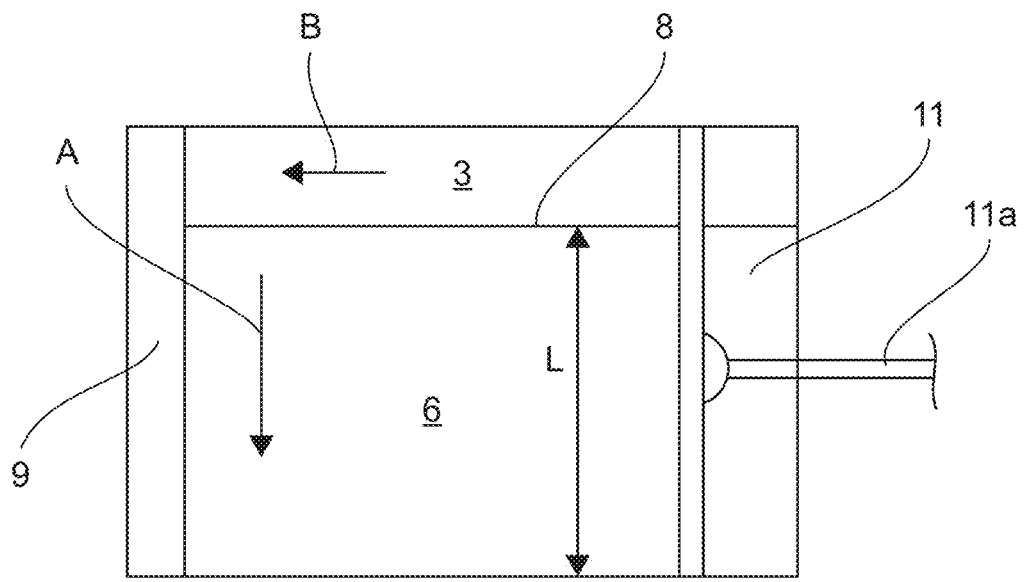
FIG. 5 is a schematic top view of the assembly of contact and flotation tanks of this installation.

The flotation tank is also provided with means for discharging floating sludge comprising a weir 9 and a scraper 11 (shown in FIG. 5).

According to the invention, said contact tank 3 is provided along said flotation tank 6 and delimits a single contact zone for said water to be treated with said white water.

Figure 1:
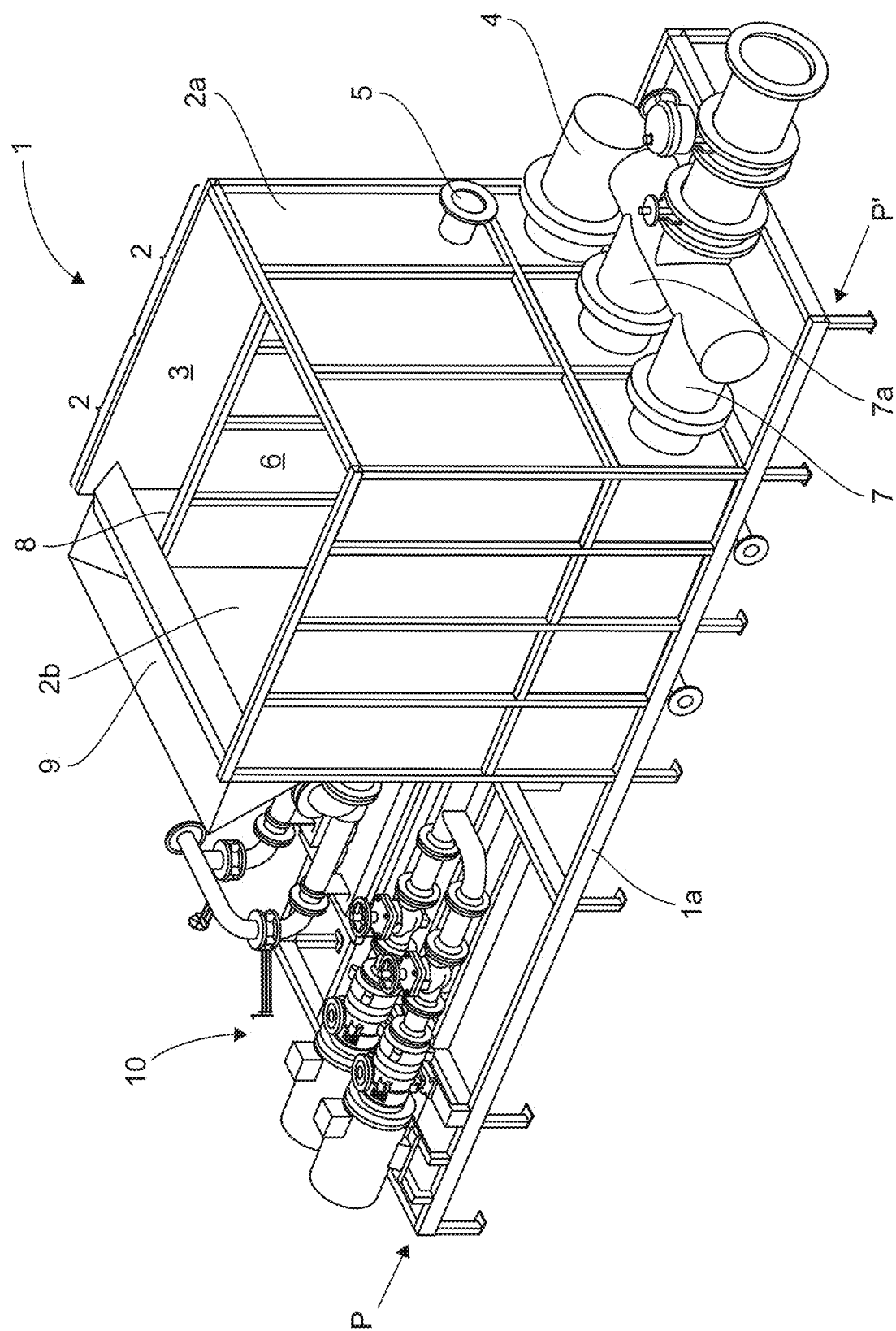
FIG. 1 is a perspective view of an embodiment of the present invention.
Figure 2:
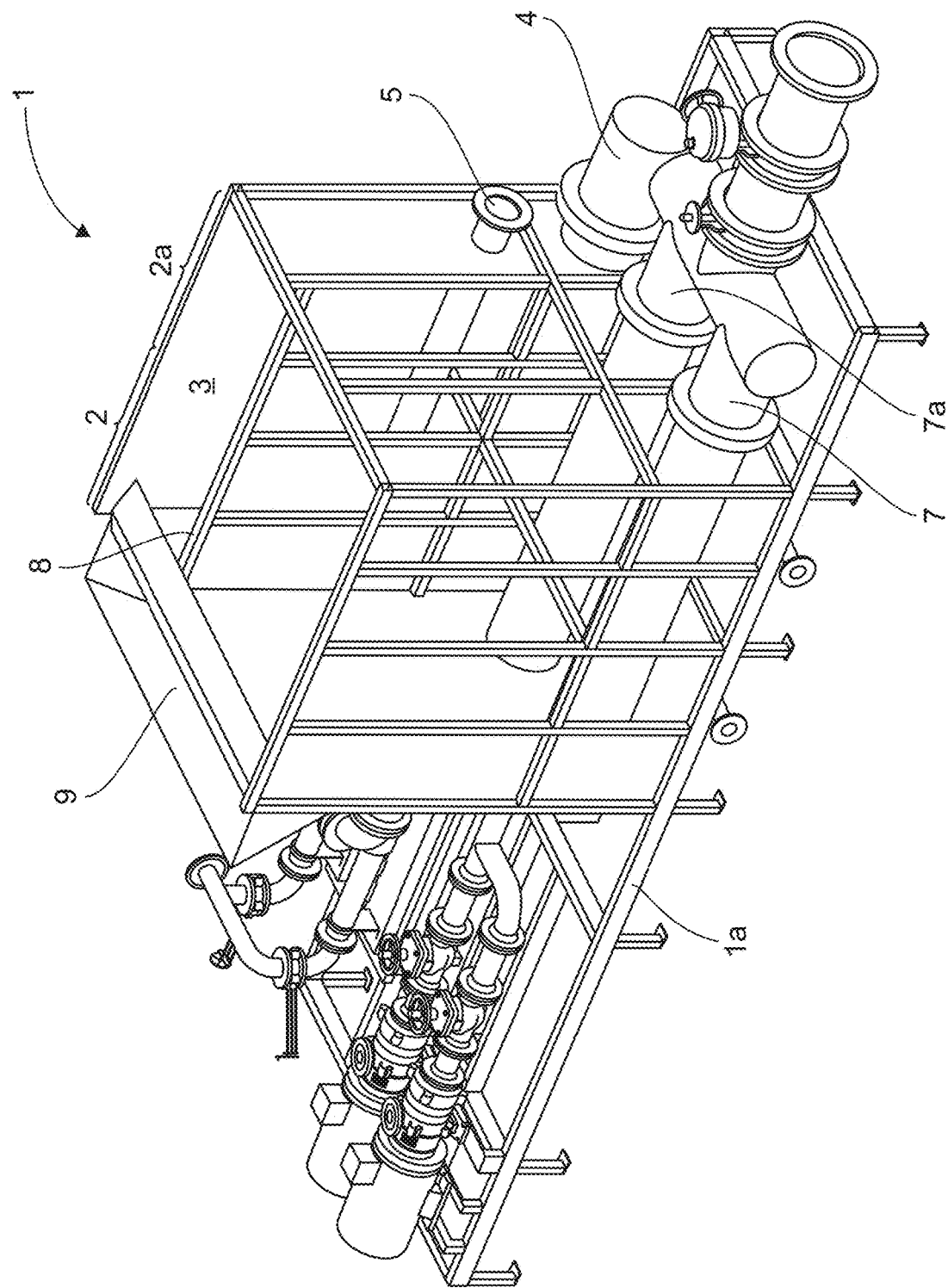
FIG. 2 shows a partially transparent perspective view of this embodiment.
Figure 3:
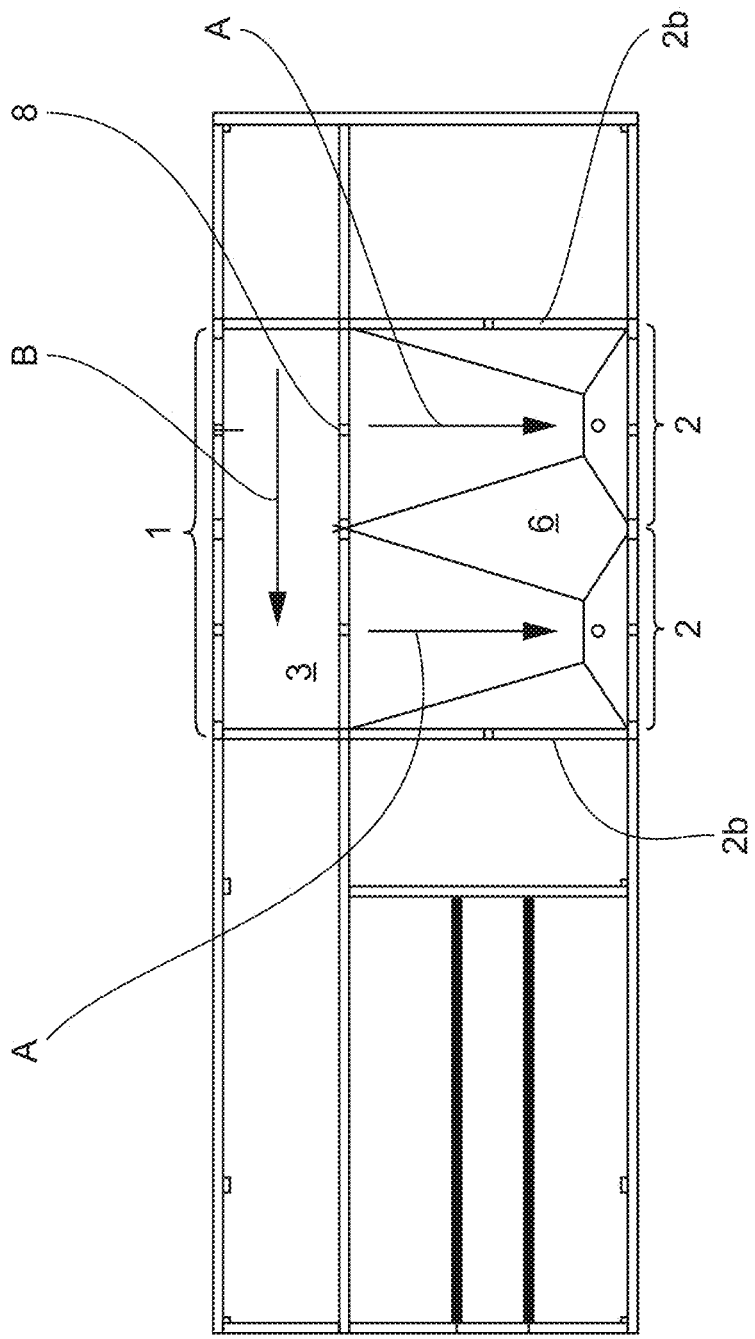
FIG. 3 is a horizontal cross-section view P-P' of the installation to clarify the water flows in its tanks.

Also according to the invention, and with reference to FIG. 3, the supply means for water to be treated 4 are configured to distribute the water to be treated in the contact tank 3 according to a longitudinal water supply flow, the distribution flow (A) of water in the flotation tank 3 being perpendicular to the water supply flow (8) in the contact tank 6.

In operation, the water to be treated is supplied to the single flotation zone delimited by the flotation tank 3, through the pipe 4, where it is brought into contact with the white water supplied by the pipe 5 provided with nozzles.

The very fine air bubbles dispensed by these nozzles immediately mix with the water to be treated and this mixture overflows through the wall 8 into the flotation tank 6. In this tank 8, the flotation of the matter to be separated from the water takes place thanks to the action of the air bubbles which, by mixing with this matter, reduce its density and thus make it float.

Periodically, the scraper 11 is operated to push the floating matter to the surface of the water in the flotation tank and also in the contact tank to the weir 9, to be discharged from the installation for possible treatment. To this end, this scraper has a moving axis 11a perpendicular to the treatment flow A of the water in the flotation tank 6.

It will therefore be noted that the scraper 11 is designed to scrape both the surface of the water in the flotation tank 6 and the one in the contact tank 3. As a corollary, the weir 9 extends transversely to these two tanks in order to be able to receive the floated matter.

The treated water is collected in the lower part of the flotation tank through pipes 7 and 7a.

Comparative Tests

The flotation installation according to the invention described above and a flotation installation of the prior art according to WO2008142026 were implemented to treat an effluent consisting of water from a dairy industry.

In comparison, the installation according to the invention is much more compact than the tested installation of the prior art. In practice, this installation according to the invention has a size 30% smaller than the latter.

Moreover, compared to the installation of the prior art, the installation according to the invention is modular and can be transported in a container, whereas the one of the prior art system is neither modular nor transportable.

Different batches of said effluent were treated by the installation according to WO2008142026 and, for each batch, the suspended matter (MES) content at the input on the raw water and at the outlet of the installation on the clarified water was measured in order to deduce, for each batch, the abatement rate, expressed in %, of this matter.

During these tests, a coagulant and a flocculant were injected into the installation.

The tests were carried out with the effluent flowing through the installation at a mirror velocity of 26 m/h.

Figure 7:
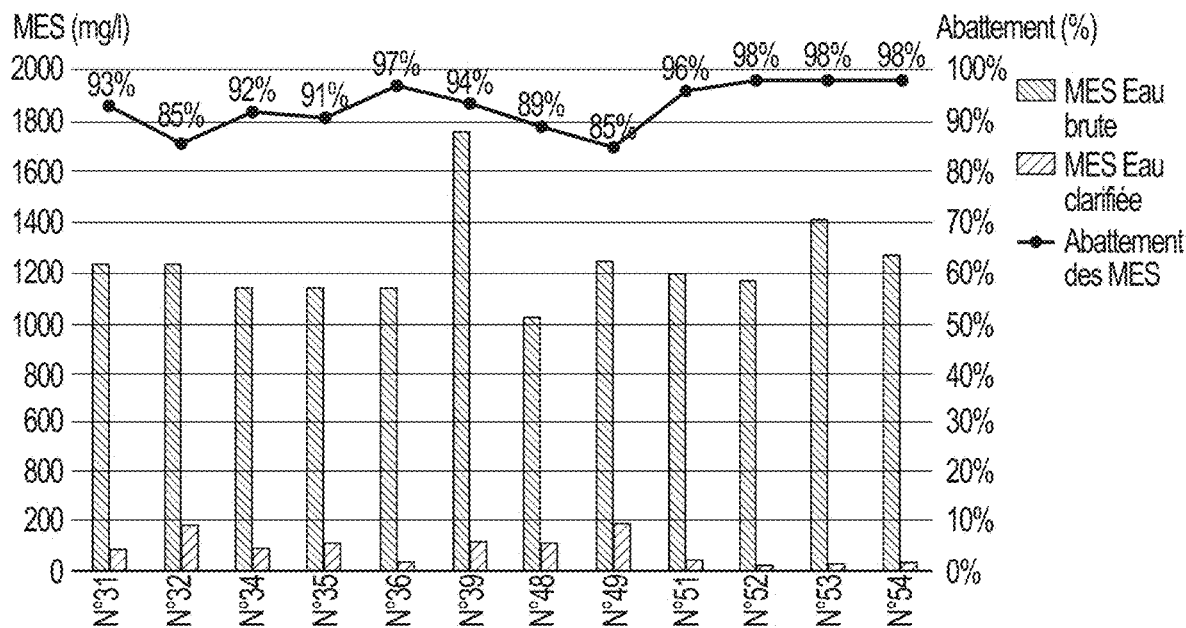
FIG. 7 is a graph showing the removal of suspended matter from an effluent using a flotation installation of the prior art according to WO2008142026.

With reference to FIG. 7, varying abatement rates of suspended matter according to the batches were observed from 85% to 98%.

Different batches of the same effluent were then treated using the embodiment of the invention described with reference to FIGS. 1 to 6.

Figure 8:
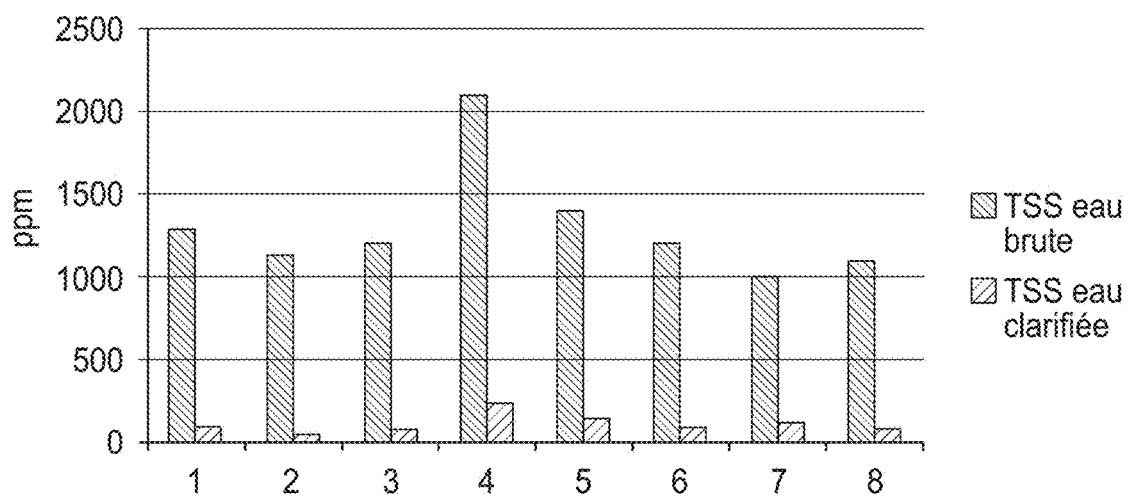
FIG. 8 is a graph showing the suspended matter contents at the input and output of a flotation installation according to the invention of the same effluent.

With reference to FIG. 8, for each batch, the suspended matter content (TSS) at the input and the output of the installation was measured. Based on these measurements, the abatement rates of suspended matter were calculated and found to be quite comparable to those obtained with the installation according to WO2008142026.

The tests were carried out with the effluent flowing through the installation at mirror velocities also similar to those implemented with the installation of the prior art, varying from 20 to 25 m/h depending on the batches.

These comparative tests show that the installation according to the invention offers treatment performances that are equivalent to those of the installation of the prior art while being 30% smaller in size.

This is due to the improved distribution of white water in the contact tank made possible by the invention. The invention indeed allows to distribute the white water uniformly in the contact tank and thus to ensure that the entirety of the treated effluent is brought into contact with the same quantity of white water.

The invention claimed is:

1. A modular and transportable apparatus for treating water by a flotation process comprising:
    a frame designed to be transported from one location to another;
    a modular contact tank and flotation tank mounted on the frame, the two tanks form a parallelepiped configuration;
    the contact tank having two ends and a side wall;
    the flotation tank having two ends and a side wall;
    an overflow wall forming a part of both the contact and flotation tanks and separating the contact and flotation tanks;
    a water inlet designed to direct the water to be treated into the contact tank, the water inlet including a water inlet pipe that projects into and through at least a portion of the contact tank and which extends generally parallel to the overflow wall;
    a white water inlet designed to direct white water into the contact tank for treating the water, the white water inlet including a white water inlet pipe that projects into and through the contact tank above the water inlet pipe and one or more nozzles communicatively connected to the white water inlet pipe and designed to disperse the white water into the contact tank;
    the contact tank, flotation tank and the overflow wall designed to cause water in the contact tank to overflow the overflow wall into the flotation tank in a direction that is perpendicular to the flow of water through the water inlet pipe in the contact tank;

a treated water outlet communicatively connected to the flotation tank and designed to direct treated water from the flotation tank; and a sludge scraper disposed over the flotation tank for scraping sludge off the surface of the water contained in the flotation tank, and wherein the sludge scraper is designed to move back and forth across the flotation tank in a direction generally perpendicular to the direction of flow of the water overflowing the overflow wall from the contact tank to the flotation tank.

2. The modular and transportable apparatus of claim 1 including a white water generator mounted on the frame adjacent the flotation and contact tanks and designed to generate white water and direct the generated white water to the white water inlet.

3. The modular and transportable apparatus of claim 2 wherein the white water generator comprises a multi-phase pump and a static mixer, and wherein the white water generated is dispersed through the nozzles that produce bubbles.

4. The modular and transportable apparatus of claim 1 wherein the one or more nozzles in the contact tank are spaced above the water inlet pipe.

5. The modular and transportable apparatus of claim 1 wherein there is provided a plurality of nozzles in the contact tank and wherein the density of the nozzles in the contact tank comprises between 3 and 30 nozzles per square meter of a bottom of the contact tank.

6. The modular and transportable apparatus of claim 1 wherein the contact tank is elongated and wherein the water inlet pipe extends longitudinally through at least a portion of the contact tank.

7. The modular and transportable apparatus of claim 1 wherein the sludge scraper spans both the flotation tank and the contact tank and moves back and forth over both the flotation tank and the contact tank.

8. A method of treating water through a flotation process comprising:

directing the water to be treated through a water inlet pipe extending into a contact tank supported on a transportable frame;

generating white water on the transportable frame;

directing the white water into the contact tank and dispersing the white water into the contact tank through nozzles so as to form bubbles in the water, the nozzles being disposed above the water inlet pipe in the contact tank;

transferring the water in the contact tank to a flotation tank mounted adjacent the contact tank on the transportable frame, the contact tank and flotation tank forming a parallelepiped configuration;

transferring the water from the contact tank to the flotation tank including causing the water in the contact tank to overflow an overflow wall that separates the contact tank and flotation tank into the flotation tank;

wherein the direction of flow of the water flowing from the contact tank over the overflow wall into the flotation tank is perpendicular to the direction of water flowing into the contact tank via the water inlet pipe;

wherein suspended matter in the water floats to a surface of the water in the flotation tank and forms a sludge on the surface of the water; and utilizing a sludge scraper that is mounted over the flotation tank to scrape sludge from the surface of the water in the flotation tank and wherein the sludge scraper is moved over the surface of the water in the flotation tank in a direction generally perpendicular to the direction of the flow of the water from the contact tank to the flotation tank.

9. The method of claim 8 wherein the contact tank and flotation tank are of a modular construction.

10. The method of claim 8 wherein the sludge scraper spans both the contact tank and the flotation tank and moves across the surface of the water contained in both the contact tank and the flotation tank.

11. The method of claim 8 including generating the white water via a multi-phase pump and a static mixer supported on the transportable frame.

* * * * *